US012225258B2

United States Patent
Mahadeva et al.

(10) Patent No.: US 12,225,258 B2
(45) Date of Patent: Feb. 11, 2025

(54) INTELLIGENT REMOTE CONTROL POSITIONING AND ALERT SYSTEM

(71) Applicant: ARRIS Enterprises LLC, Suwanee, GA (US)

(72) Inventors: Swaroop Mahadeva, Bengaluru (IN); Sadeesh Kumar Karuppiah, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 4 days.

(21) Appl. No.: 17/959,416

(22) Filed: Oct. 4, 2022

(65) Prior Publication Data

US 2023/0103530 A1 Apr. 6, 2023

Related U.S. Application Data

(60) Provisional application No. 63/252,766, filed on Oct. 6, 2021.

(51) Int. Cl.
*H04N 21/422* (2011.01)
*H04W 84/18* (2009.01)

(52) U.S. Cl.
CPC . *H04N 21/42222* (2013.01); *H04N 21/42221* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2007/0293190 | A1* | 12/2007 | Ota | H04N 21/4882 348/E5.103 |
| 2011/0304778 | A1* | 12/2011 | Roberts | G08C 17/02 709/203 |
| 2013/0279297 | A1* | 10/2013 | Wulff | G10K 11/346 367/138 |
| 2019/0347927 | A1 | 11/2019 | Griffin | |

FOREIGN PATENT DOCUMENTS

CN 112055240 12/2020

OTHER PUBLICATIONS

International Search Report and the Written Opinion of the International Searching Authority dated Jan. 19, 2023, in International (PCT) Application No. PCT/US2022/045618.
International Preliminary Report on Patentability Apr. 9, 2024 in International (PCT) Application No. PCT/US2022/045618.

* cited by examiner

*Primary Examiner* — Samira Monshi
(74) *Attorney, Agent, or Firm* — Wenderoth, Lind & Ponack, L.L.P.

(57) ABSTRACT

A system for determining a location and an orientation of a remote control unit within a mesh network. A remote control unit (RCU) includes a top wireless orientation beacon at a first end and a bottom wireless orientation beacon at a second end. The top wireless orientation beacon and the bottom wireless orientation beacon provide location information to a controller device. A plurality of wireless mesh beacons are disposed in a predetermined area to form a mesh network, and the controller device uses the plurality of mesh beacons to generate a map of the predetermined area. The controller device processes location information obtained from the RCU to determine a position and orientation of the RCU relative to the controller device in the map of the predetermined area.

19 Claims, 7 Drawing Sheets

INTELLIGENT REMOTE CONTROL POSITIONING AND ALERT SYSTEM

BACKGROUND

The subject matter of the present disclosure relates generally to determining a location and orientation of a remote control unit within a mesh network.

Some services, such as telemedical services, need to receive and send control signals via a Remote-Control Unit (RCU). Some functionality provided by such services may be automated and provide time sensitive signals to the RCU. For example, a service may need to control a display device, which is generally controlled by a controller device, such as a set-top box. However, the service may need to take control other than through use of the controller device, such as through use of the RCU.

If the control signals that are used for such automation are InfraRed (IR) signals, then there are limitation or prerequisite conditions to ensure that the IR signal from the RCU reaches the intended controller device. For example, the IR signals from the RCU may not reach the controller device because the RCU is out of the range of the controller device, the RCU is not pointing in the direction of the controller device, or the RCU may not be establishing the required subtended angle to ensure a successful reception of the IR signal.

Thus, there is a need to determine a location and orientation of an RCU.

SUMMARY

An aspect of the present disclosure involves a system and method to determining a location and orientation of a remote control unit within a mesh network.

A system for determining a location and orientation of a remote control unit within a mesh network includes a controller device (CD) coupled to a display device, and a remote control unit (RCU) having a top wireless orientation beacon at a first end and a bottom wireless orientation beacon at a second end, wherein the top wireless orientation beacon and the bottom wireless orientation beacon provide location information to the controller device, and wherein the controller device processes the location information to determine a position and orientation of the RCU relative to the controller device.

A plurality of wireless mesh beacons are disposed in a predetermined area to form a mesh network, and the controller device uses the plurality of mesh beacons to generate a map of the predetermined area.

The plurality of wireless mesh beacons include a first subset that communicate directly with the controller device and a second subset that communicate with the first subset, wherein the first subset provides a first signal including an identifier and timestamp of each wireless mesh beacon in the first subset to the controller device and relays a second signal including an identifier and timestamp of each wireless mesh beacon in the second subset to the controller device, wherein the controller device processes the first signal and the second signal to determine a location in the predetermined area for each of the plurality of wireless mesh beacons in the first subset and in the second subset.

The location information is provided in a first signal from the top wireless orientation beacon that includes a first identifier of the top wireless orientation beacon and a first timestamp and in a second signal from the bottom wireless orientation beacon that includes a second identifier of the bottom wireless orientation beacon and a second timestamp.

The first signal and the second signal are received by a plurality of wireless mesh beacons, wherein the plurality of wireless mesh beacons determine a power measurement associated with the first signal and with the second signal, the plurality of wireless mesh beacons forward, to the controller device, the first identifier of the top wireless orientation beacon, the first timestamp from the first signal, and the power measurement associated with the first signal, and the second identifier of the bottom wireless orientation beacon, the second timestamp from the second signal, and the power measurement associated with the second signal.

The controller device determines a first position of the top wireless orientation beacon at a first end of the RCU using the first identifier of the top wireless orientation beacon, the first timestamp from the first signal, and the power measurement associated with the first signal, and determines a second position of the bottom wireless orientation beacon at the second end of the RCU using the second identifier of the bottom wireless orientation beacon, the second timestamp from the second signal, and the power measurement associated with the second signal.

The controller device generates an out-of-range indication when the controller device determines one of the RCU is not located within the predetermined area and the orientation of the RCU prevents the controller device from receiving a command signal from the RCU, wherein the out-of-range indication includes at least one of a vibration of the RCU, a warning sound played by the RCU or the display device, a warning displayed on the display device, and a voice notification played by the RCU or the display device.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to determining a location and orientation of a remote control unit within a mesh network.

Figure 1:
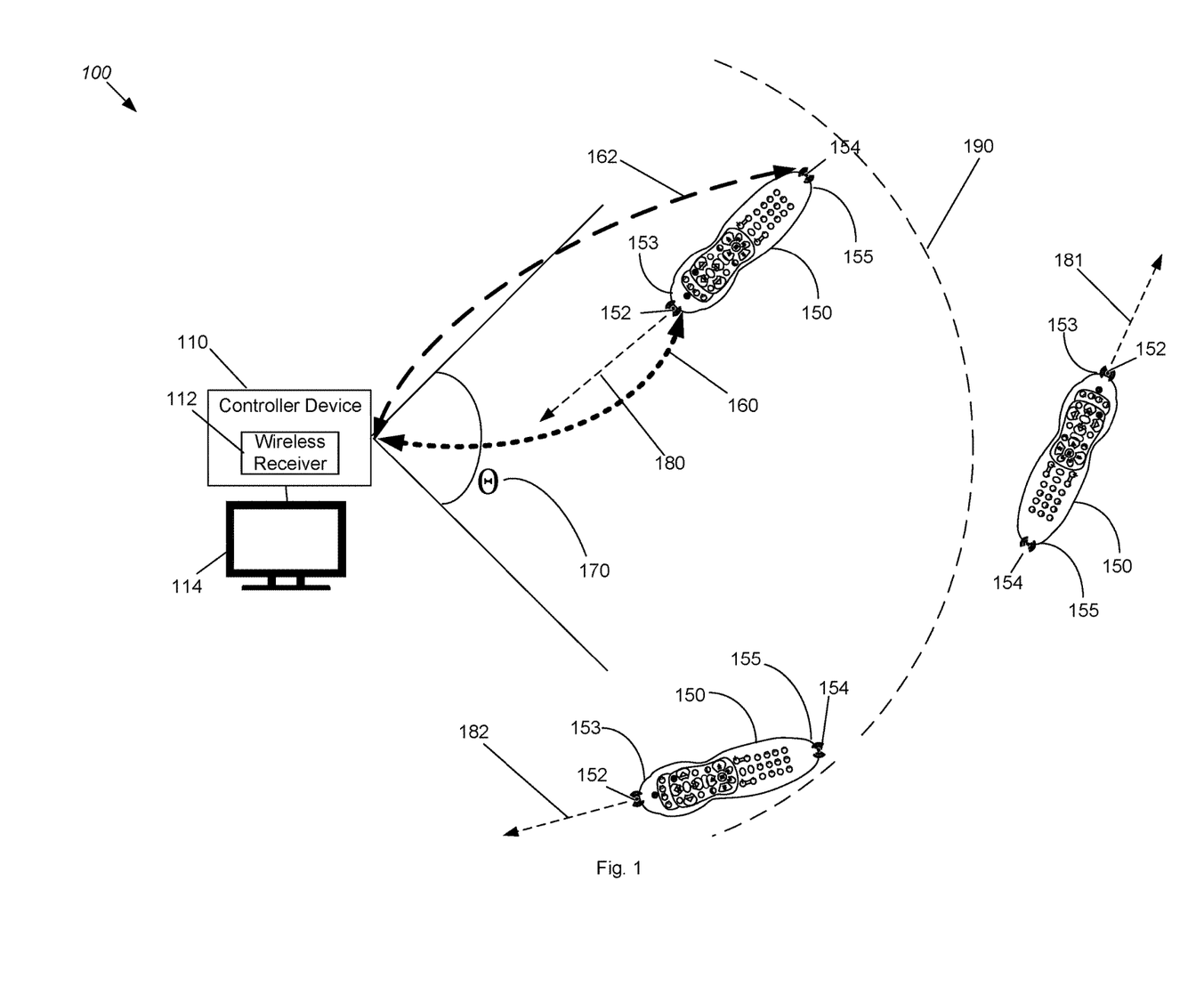
FIG. 1 illustrates a remote control unit (RCU) positioning.

FIG. 1 illustrates a remote control unit (RCU) positioning 100.

In FIG. 1, the RCU 150 is positioned relative to a controller device 110. The RCU 150 includes a first wireless orientation beacon 152 at a first end of the RCU 150 and a wireless orientation beacon 154 at a second end of the RCU 150. For example, the first wireless orientation beacon 152 may be located proximate a top end 153 of the RCU and the second wireless orientation beacon 154 may be located proximate a bottom end 155 of the RCU 150. The controller device 110 includes a wireless receiver 112 that may receive a first signal 160 from the first wireless orientation beacon 152 and a second signal 162 from the second wireless orientation beacon 154. The controller device 110 may be a multimedia device such as a set-top box, TV dongle, satellite receiver, etc. The controller device 110 may thus present video or graphics on a display device 114.

In FIG. 1, when the RCU 150 has an orientation 180 where the RCU 150 is directed toward the controller device 110 within a predetermined angle 170, the wireless receiver 112 of the controller device 110 receives the first signal 160 from the first wireless orientation beacon 152 and a second signal 162 from the second wireless orientation beacon 154. However, when the RCU 150 has an orientation 181 pointing away from wireless receiver 112 of the controller device 110 or the RCU 150 is outside the range 190 of the controller device 110, the wireless receiver 112 of the controller device 110 does not receive signals from the RCU 150. Similarly, when the RCU 150 has an orientation 182 where the RCU 150 is directed outside the predetermined angle 170, the wireless receiver 112 of the controller device 110 does not receive signals from the RCU 150.

Figure 2:
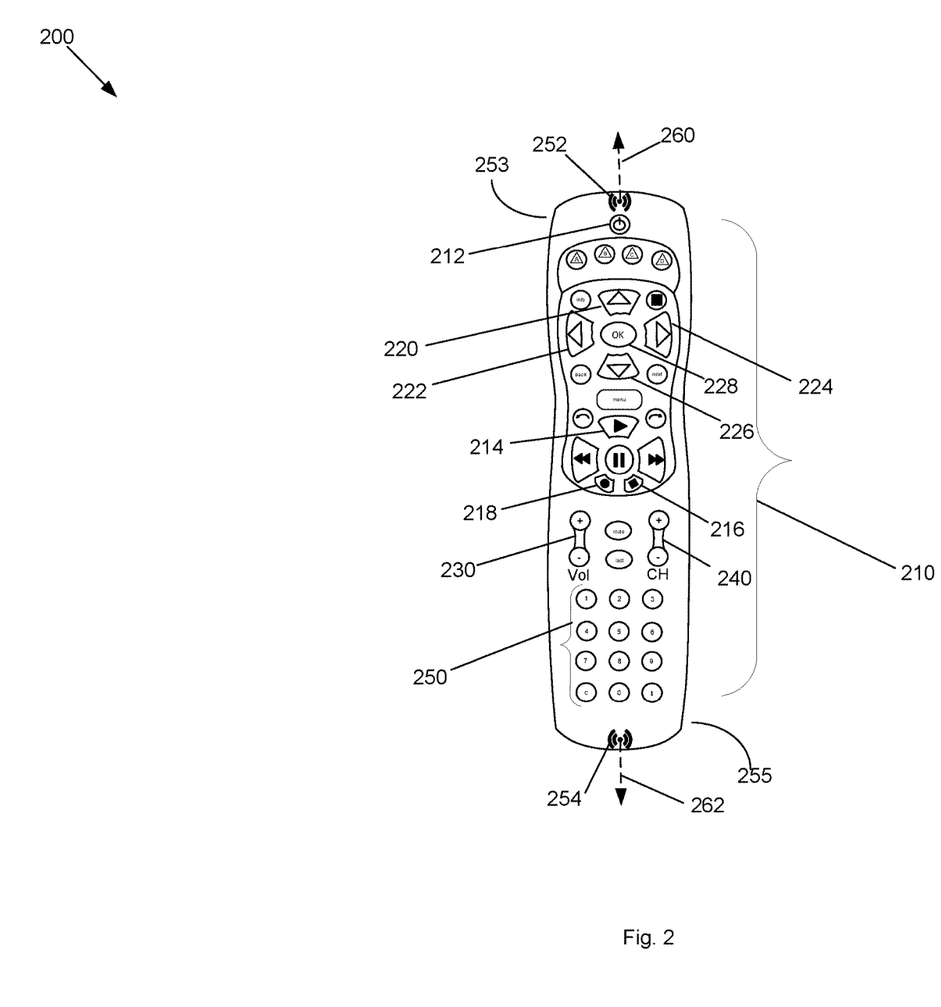
FIG. 2 illustrates a remote control unit (RCU).

FIG. 2 illustrates a remote control unit (RCU) 200.

In FIG. 2, RCU 200 includes controls 210 for operation of the controller device. Controls 210 may include a power button 212 for turning the controller device on and off, presentation controls such as a play key 214, a stop key 216, and a record key 218. Controls 210 may also include navigation keys, such as up key 220, left key 222, right key 224, down key 226, and selection/OK key 228. RCU 200 may further include volume control key 230, channel control key 240, and a numeric keypad 250. However, controls 210 are shown for illustration only and RCU 200 may include additional or fewer controls 210.

RCU 200 includes a first wireless orientation beacon 252 at a first end of the RCU 200 and a second wireless orientation beacon 254 at a second end of the RCU 200. For example, the first wireless orientation beacon 252 may be located proximate a top/forward end 253 of the RCU 200 and the second wireless orientation beacon 254 may be located proximate a bottom/read end 255 of the RCU 200. A wireless receiver of a controller device 110 receives A first signal 260 may be provided by the first wireless orientation beacon 252 and a second signal 262 may be provided by the second wireless orientation beacon 254. The first signal 260 and the second signal 262 may be received by a wireless receiver of a controller device, as shown in FIG. 1, wherein the first signal 260 and the second signal 262 are processed to provide an orientation of the RCU 200.

Figure 3:
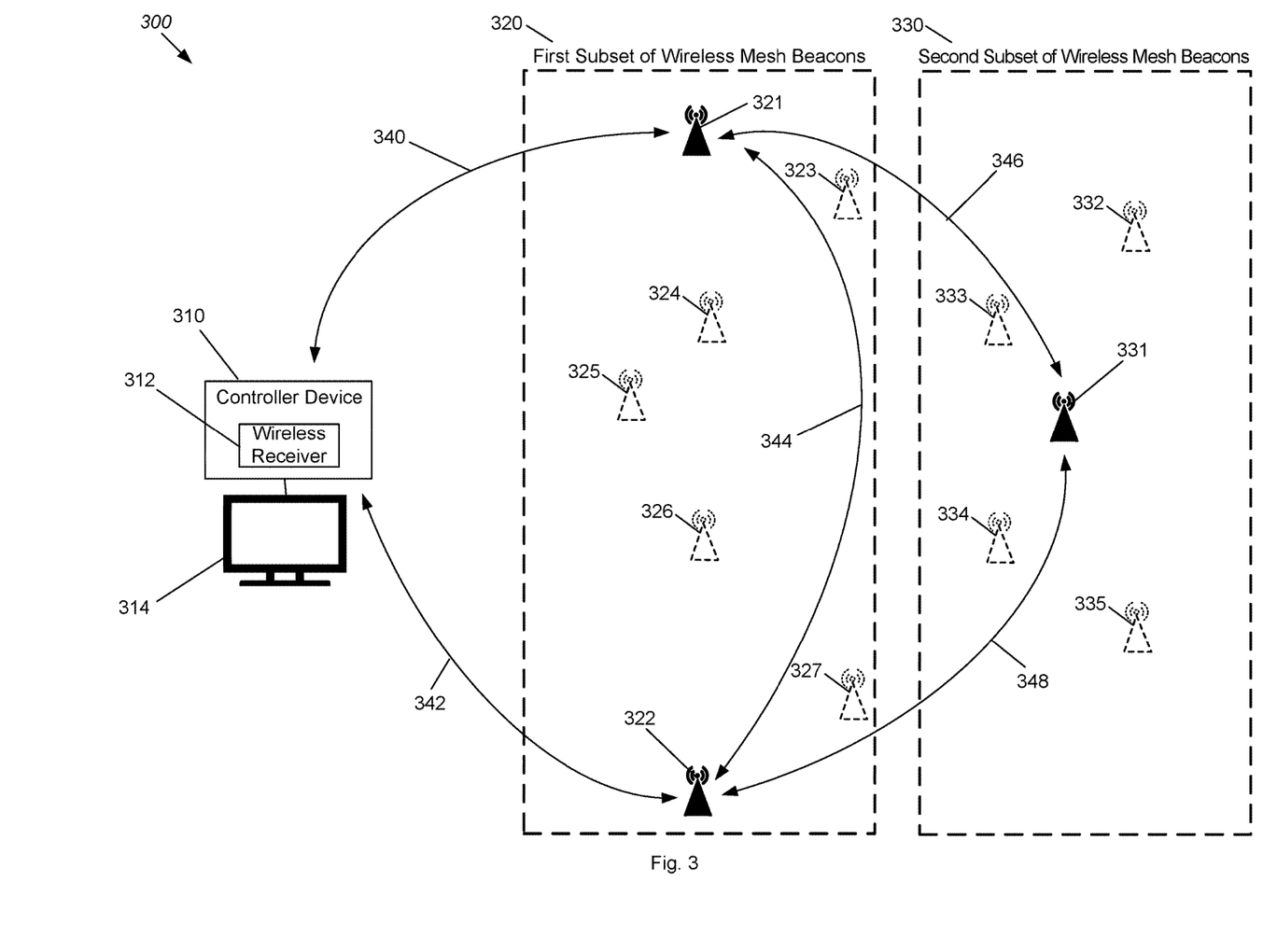
FIG. 3 illustrates a wireless mesh network.

FIG. 3 illustrates a wireless mesh network 300.

In FIG. 3, a wireless mesh network is formed using a plurality of wireless mesh beacons disposed in a predetermined area. For example, the wireless mesh network 300 is formed using wireless mesh beacons 321, 322, 323, 324, 325, 326, 327, 331, 332, 333, 334, and 335. A Bluetooth mesh network may be formed using Bluetooth Low Energy (BLE) beacons that allows for many-to-many communication. A Bluetooth mesh network includes a network of devices, or nodes, connected directly, dynamically, and non-hierarchically to as many other nodes as possible. The nodes cooperate with each other by exchanging data. Bluetooth Low Energy (LE) is designed for very low power operation. using a Bluetooth beacon. A Bluetooth beacon repeatedly transmits a constant signal that other devices can detect. A first subset of wireless mesh beacons 320 includes wireless mesh beacons 321, 322, 323, 324, 325, 326, 327 that communicate directly with the controller device 310 via signals 340, 342, and a second subset of wireless mesh beacons 330 that includes wireless mesh beacons 331, 332, 333, 334, 335 that communicate with the first subset of wireless mesh beacons 320 via signals 346, 348.

Controller device 310 may include a wireless receiver 312 for receiving, for example, signals 340, 342 from the first subset of wireless mesh beacons 320. Controller device 310 may be coupled to display device 314 to present, for example, video or graphics on display device 314. Wireless mesh beacons 321, 322, 323, 324, 325, 326, 327, 331, 332, 333, 334, 335 may communicate with each other, such as, for example, wireless mesh beacon 321 communicating with wireless mesh beacon 322 via signal 344.

Figure 4:
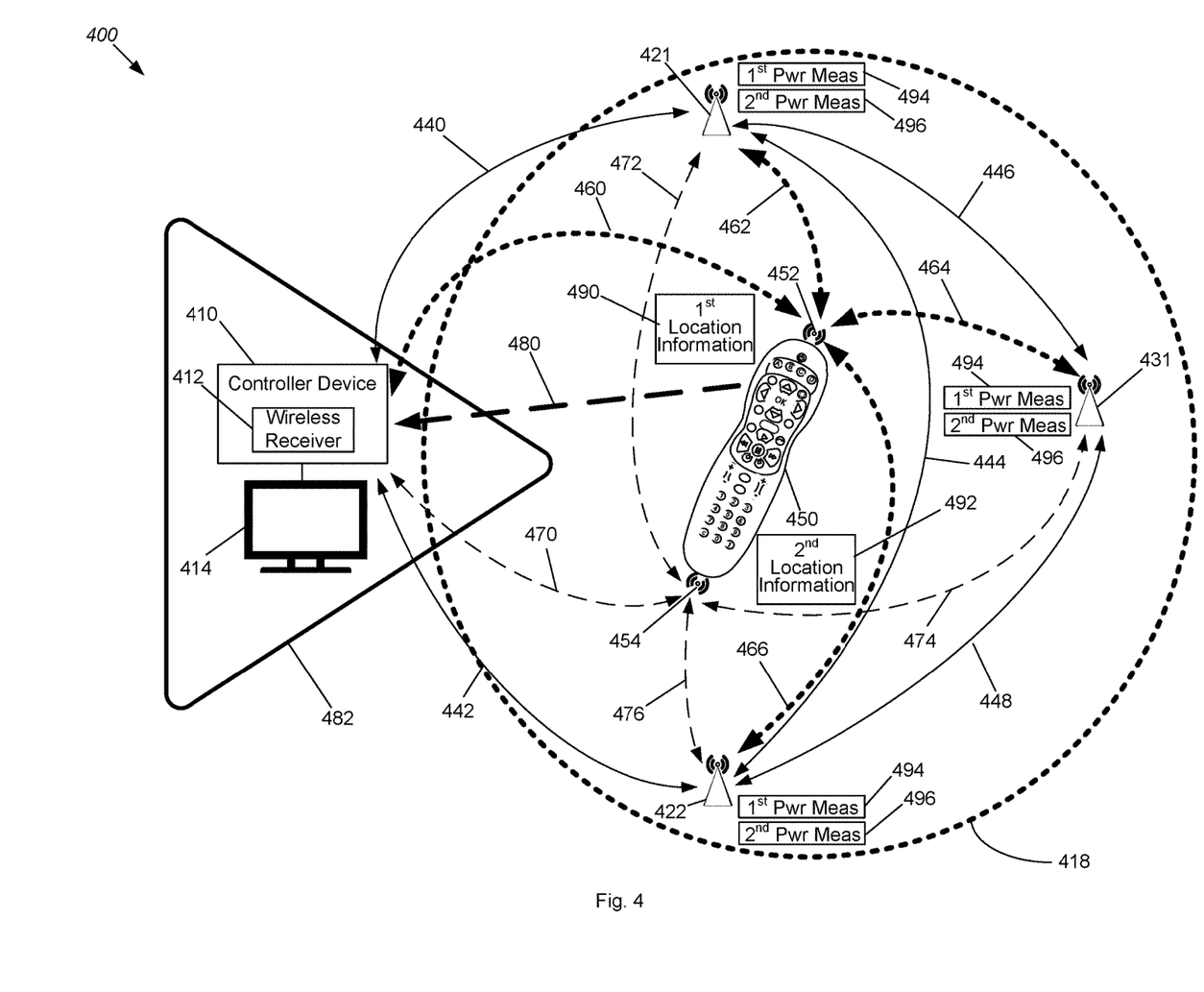
FIG. 4 illustrates a system for determining a location and orientation of a remote control unit within a mesh network.

FIG. 4 illustrates a system 400 for determining a location and orientation of a remote control unit within a mesh network.

In FIG. 4, the system includes controller device 410, which may receive signals using a wireless receiver 412. Controller device 410 may be coupled to display device 414 to present, for example, video or graphics on display device 414. A wireless mesh network map 418 is determined using signals from wireless mesh beacon 421, 422, 431. Wireless mesh beacon 421 and controller device 410 communicate via signal 440. Wireless mesh beacon 422 and controller device 410 communicate via signal 442. Wireless mesh beacon 421 and wireless mesh beacon 422 communicate via signal 444. Wireless mesh beacon 421 and wireless mesh beacon 431 communicate via signal 446. Wireless mesh beacon 431 and wireless mesh beacon 422 communicate via signal 448.

RCU 450 includes a top wireless orientation beacon 452 at a first end of the RCU 450 and a bottom wireless orientation beacon 454 at a second end of the RCU 450. RCU 450 is located within the wireless mesh network map 418. Wireless mesh beacons 421, 422, 431 positioned around an area, such as a room, communicate with RCU 450 to discover the location of beacons 452, 454 in the RCU 450. Top wireless orientation beacon 452 may communicate with controller device 410 via signal 460, with wireless mesh beacon 421 via signal 462, with wireless mesh beacon 431 via signal 464, and wireless mesh beacon 422 via signal 466. Bottom wireless orientation beacon 454 may communicate with controller device 410 via signal 470, with wireless mesh beacon 421 via signal 472, with wireless mesh beacon 431 via signal 474, and wireless mesh beacon 422 via signal 476.

The controller device 410 determines the map 418 of the area using signals from wireless mesh beacon 421, wireless mesh beacon 431, and wireless mesh beacon 422. The controller device 410 determines the orientation of the RCU 450 using first location information 490 and second location information 492 obtained through signals from the RCU 450. The controller device 410 determines the orientation of the RCU 450 using signals 460, 470 from the top wireless orientation beacon 452 at the first end of the RCU 450 and the bottom wireless orientation beacon 454 at the second end of the RCU 450 respectively, as well as from signals 440, 442, 446, 448 from wireless mesh beacon 421, wireless mesh beacon 431, and wireless mesh beacon 422. The controller device performs a geometrical calculation using signals 460, 470, 440, 442, 446, 448 to determine the location and orientation of the RCU 450 within the network map 418 with respect to the controller device 410. RCU must be in range of the controller device 410 and must be suitably oriented in order to form the required subtended angle 480 with a receiving area 482 of the controller device 410 so that the IR signals from the RCU 450 are correctly received by the controller device 410.

For example, first location information 490 may be provided by the top wireless orientation beacon 452 at the first end of the RCU 450 and second location information 492 may be provide by the bottom wireless orientation beacon 454 at the second end of the RCU 450. The first location information 490 may include a first identifier of the top wireless orientation beacon 452 and a first timestamp. The second location information 492 may include a second identifier of the bottom wireless orientation beacon and a second timestamp. The first location information 490 and the second location information 492 may be provided, for example, to the controller device 410, wireless mesh beacon 421, wireless mesh beacon 431, and wireless mesh beacon 422. The first location information 490 and the second location information 492 provided by the RCU 450 to wireless mesh beacon 421, wireless mesh beacon 431, and wireless mesh beacon 422 are provided to controller device 410, which uses the first location information 490 and the second location information 492 to determine the location and orientation of the RCU 450 within the network map 418 with respect to the controller device 410.

Wireless mesh beacon 421, wireless mesh beacon 431, and wireless mesh beacon 422 may determine the first location information 490 and the second location information 492 using different techniques. For example, wireless mesh beacon 421, wireless mesh beacon 431, and wireless mesh beacon 422 may determine the first location information 490 and the second location information 492 using power measurements such as received signal strength indicators (RSSI). However, other location determination techniques may be used instead. Thus, as one example, wireless mesh beacon 421, wireless mesh beacon 431, and wireless mesh beacon 422 may determine a first power measurement 494 associated with the first signals 462, 464, 466 and a second power measurement 496 associated with the second signals 472, 474, 476. Wireless mesh beacon 421, wireless mesh beacon 431, and wireless mesh beacon 422 may each forward the first location information 490 and the second location information 492 along with the first power measurement 494 associated with the first signals 462, 464, 466 and with the second power measurement 496 associated with the second signals 472, 474, 476 to the controller device 410. The controller device 410 may thus determine a first position of the top wireless orientation beacon 452 at the first end of the RCU 450 using the first location information 490 and the first power measurement 494 associated with the first signals 462, 464, 466, and determines a second position of the bottom wireless orientation beacon 454 at the second end of the RCU 450 using the second location information 492 and the second power measurement 496 associated with the second signals 472, 474, 476.

When the controller device 410 determines that the RCU 450 is out of its range or not oriented correctly, the controller device 410 may signal the user. For example, the controller device may send a signal to the RCU 450 to cause a vibration of the RCU 450, cause activation of a buzzer or other sound device in the RCU 450 or controller device 410, send a voice notification to the RCU 450 or controller device 410, to display a message on display device 414 that the controller device 410 tried to send an automated signal to the RCU 450, but that the RCU 450 was out of range.

Figure 5:
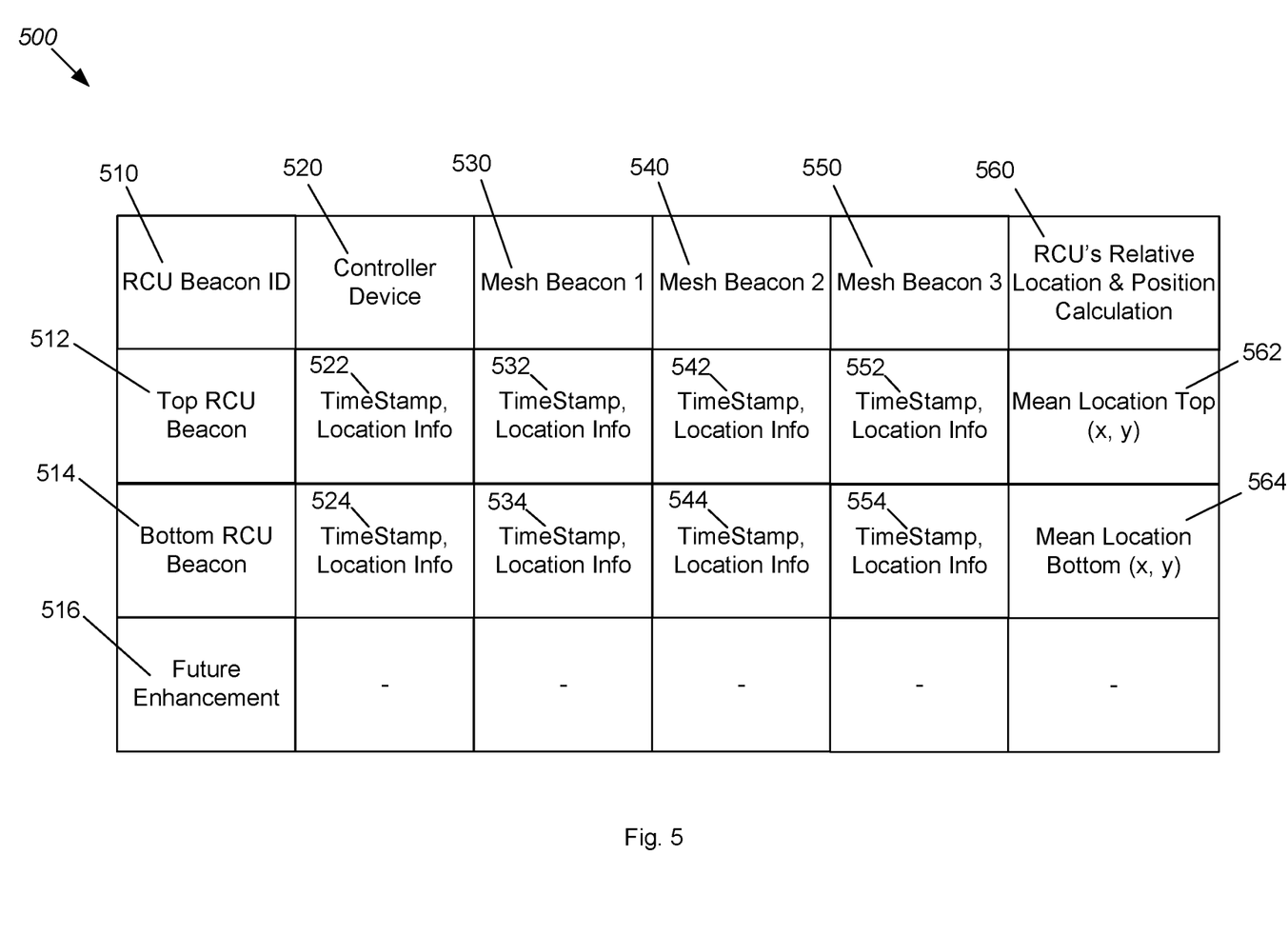
FIG. 5 illustrates parameters used by the controller device to perform the geometrical calculation.

FIG. 5 illustrates parameters used by the controller device to perform the geometrical calculation 500.

In FIG. 5, the first column shows the RCU beacon identification 510. The RCU beacon identification 510 includes an identifier for the Top RCU Beacon 512 and an identifier for the Bottom RCU Beacon 514. Row 516 provides additional areas for parameters to use for future enhancements. The Controller Device Column 520 includes a TimeStamp and Location Information 522 for the Top RCU Beacon 512 and a TimeStamp and Location Information 524 for the Bottom RCU Beacon 514.

The Mesh Beacon 1 Column 530 includes a TimeStamp and Location Information 532 for the Top RCU Beacon 512 and a TimeStamp and Location Information 534 for the Bottom RCU Beacon 514. The Mesh Beacon 2 Column 540 includes a TimeStamp and Location Information 542 for the Top RCU Beacon 512 and a TimeStamp and Location Information 544 for the Bottom RCU Beacon 514. The Mesh Beacon 3 Column 550 includes a TimeStamp and Location Information 552 for the Top RCU Beacon 512 and a TimeStamp and Location Information 554 for the Bottom RCU Beacon 514.

The controller device then uses TimeStamp and Location Information 522, 524 in the Controller Device Column 520, TimeStamp and Location Information 532, 534 in the Mesh Beacon 1 Column 530, TimeStamp and Location Information 542, 544 in the Mesh Beacon 2 Column 540, and TimeStamp and Location Information 552, 554 in the Mesh Beacon 3 Column 550 to determine a relative location and position as shown in the RCU's Relative Location & Position Calculation Column 560. The RCU's Relative Location & Position Calculation Column 560 includes a Mean Location for the Top RCU Beacon 562 and a Mean Location for the Bottom RCU Beacon 564. The Mean Location for the Top RCU Beacon 562 and a Mean Location for the Bottom RCU Beacon 564 may be expressed as (x, y) coordinates with the network map.

Figure 6:
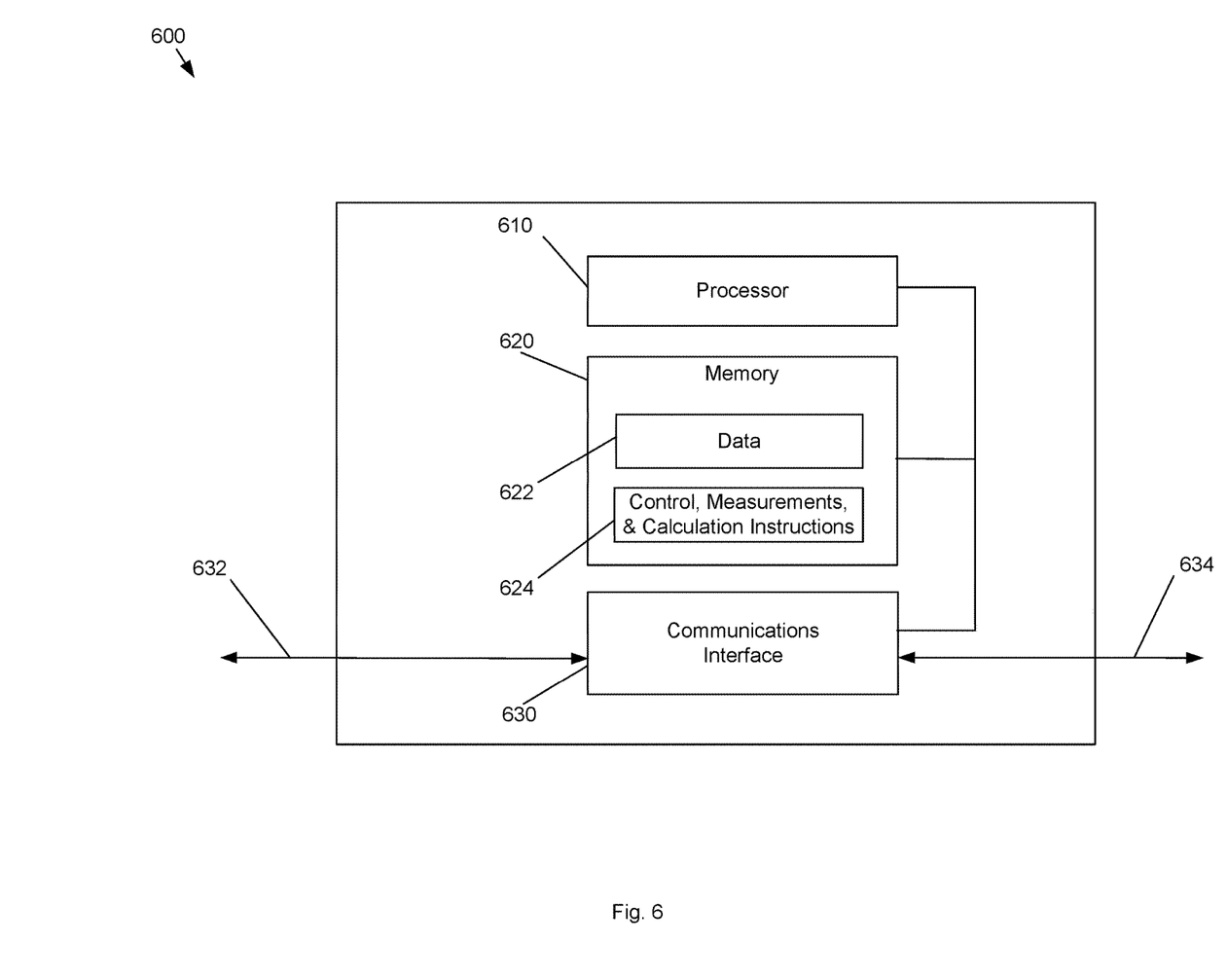
FIG. 6 is a block diagram of a network device.

FIG. 6 is a block diagram of a network device 600.

Network device 600 may be a controller device, a wireless mesh beacon, or other network device for determining a location and orientation of a remote control unit within a mesh network. Network device 600 includes a processor 610, memory 620, and communication interface 630. Memory 620 may include data 622 and control, measurements, and calculation instructions 624 for processing received signals and determining a location and orientation of an RCU within a network map. Communication device 630 processes data and packets for transmission using paths 632, 634, and implements a protocol for the transmission of data and packets within a mesh network as described above.

Processor 610 executes the instructions 624 for receiving location information for processing to determine a position and orientation of an RCU relative to a controller device. The processor may receive signals from wireless mesh beacons to generate a map of a mesh network. The signals received by the processor may include an identifier and timestamp from wireless mesh beacons that are used to determine a location in the map of the mesh network for the wireless mesh beacons.

The processor 610 may also receive signals that include first location information associated with a first wireless orientation beacon at a first end of the RCU and second location information associated with a bottom wireless orientation beacon at a second end of the RCU. The first location information may include a first identifier of the top wireless orientation beacon and a first timestamp. The second location information may include a second identifier of the bottom wireless orientation beacon and a second timestamp. The first location information and the second location information may be received directly from the RCU or from one or more of the wireless mesh beacons. The processor 610 may further receive, from the wireless mesh beacons, a first power measurement from a first wireless orientation beacon at a first end of the RCU and a second power measurement from a bottom wireless orientation beacon at a second end of the RCU. The processor 610 may determine a first position of the top wireless orientation beacon at a first end of the RCU using the first identifier of the top wireless orientation beacon, the first timestamp, and the first power measurements. The processor 610 may determine a second position of the bottom wireless orientation beacon at the second end of the RCU using the second identifier of the bottom wireless orientation beacon, the second timestamp, and the second power measurements.

The processor 610 may determine that the RCU is out of its range or not oriented correctly, and then generate a warning signal to communicate to the user that the RCU is out of its range or not oriented correctly. For example, the processor 610 may generate a warning signal for the user using a vibration event, activate a buzzer or other sound device, generate voice notification, display a message on display device that a warning signal was provided to the RCU, but the RCU was out of range.

Figure 7:
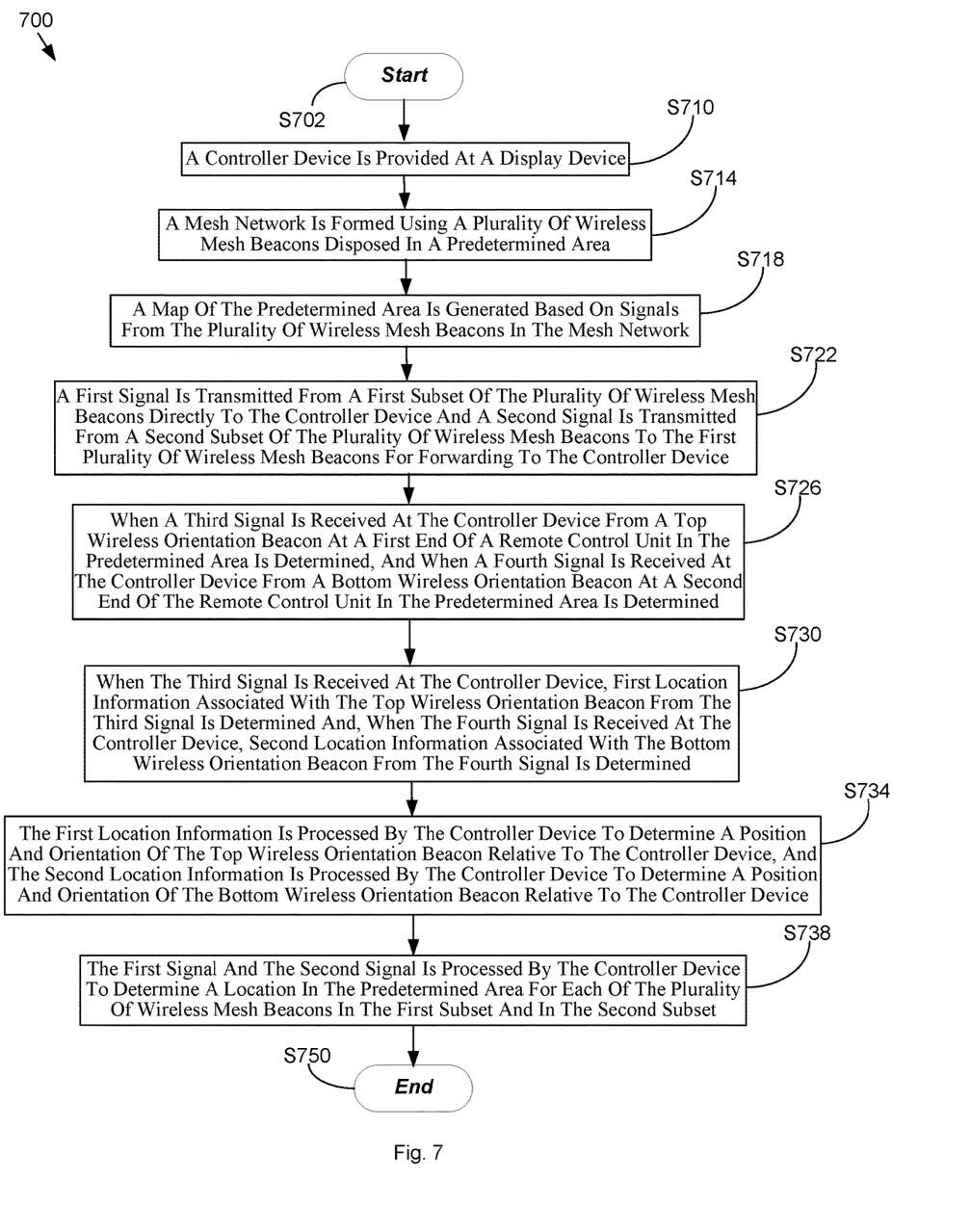
FIG. 7 is a flow chart of a method for determining a location and orientation of a remote control unit within a mesh network.

FIG. 7 is a flow chart of a method 700 for determining a location and orientation of a remote control unit within a mesh network.

In FIG. 7, method 700 starts (S702), and a controller device is provided at a display device (S710). Referring to FIG. 3, controller device 310 may be coupled to display device 314 to present, for example, video or graphics on display device 314.

A mesh network is formed using a plurality of wireless mesh beacons disposed in a predetermined area (S714). Referring to FIG. 3, a wireless mesh network is formed using a plurality of wireless mesh beacons disposed in a predetermined area. For example, the wireless mesh network 300 is formed using wireless mesh beacons 321, 322, 323, 324, 325, 326, 327, 331, 332, 333, 334, and 335. A Bluetooth mesh network may be formed using Bluetooth Low Energy (BLE) beacons that allows for many-to-many communication. A Bluetooth mesh network includes a network of devices, or nodes, connected directly, dynamically, and non-hierarchically to as many other nodes as possible. The nodes cooperate with each other by exchanging data.

A map of the predetermined area is generated based on signals from the plurality of wireless mesh beacons in the mesh network (S718). Referring to FIG. 4, the controller device 410 determines the map 418 of the area using signals from wireless mesh beacon 421, wireless mesh beacon 431, and wireless mesh beacon 422.

A first signal is transmitted from a first subset of the plurality of wireless mesh beacons directly to the controller device and a second signal is transmitted from a second subset of the plurality of wireless mesh beacons to the first plurality of wireless mesh beacons for forwarding to the controller device (S722). Referring again to FIG. 3, a first subset of wireless mesh beacons 320 includes wireless mesh beacons 321, 322, 323, 324, 325, 326, 327 that communicate directly with the controller device 310 via signals 340, 342, and a second subset of wireless mesh beacons 330 that includes wireless mesh beacons 331, 332, 333, 334, 335 that communicate with the first subset of wireless mesh beacons 320 via signals 346, 348.

When a third signal is received at the controller device from a top wireless orientation beacon at a first end of a remote control unit in the predetermined area is determined, and when a fourth signal is received at the controller device from a bottom wireless orientation beacon at a second end of the remote control unit in the predetermined area is determined (S726). Referring to FIG. 4, top wireless orientation beacon 452 may communicate with controller device 410 via signal 460, with wireless mesh beacon 421 via signal 462, with wireless mesh beacon 431 via signal 464, and wireless mesh beacon 422 via signal 466. Bottom wireless orientation beacon 454 may communicate with controller device 410 via signal 470, with wireless mesh beacon 421 via signal 472, with wireless mesh beacon 431 via signal 474, and wireless mesh beacon 422 via signal 476.

When the third signal is received at the controller device, first location information associated with the top wireless orientation beacon from the third signal is determined and, when the fourth signal is received at the controller device, second location information associated with the bottom wireless orientation beacon from the fourth signal is determined (S730). Referring to FIG. 4, first location information 490 may be provided by the top wireless orientation beacon 452 at the first end of the RCU 450 and second location information 492 may be provide by the bottom wireless orientation beacon 454 at the second end of the RCU 450. The first location information 490 may include a first identifier of the top wireless orientation beacon 452 and a first timestamp. The second location information 492 may include a second identifier of the bottom wireless orientation beacon and a second timestamp. The first location information 490 and the second location information 492 may be provided, for example, to the controller device 410, wireless mesh beacon 421, wireless mesh beacon 431, and wireless mesh beacon 422.

The first location information is processed by the controller device to determine a position and orientation of the top wireless orientation beacon relative to the controller device, and the second location information is processed by the controller device to determine a position and orientation of the bottom wireless orientation beacon relative to the controller device (S734). Referring to FIG. 4, the first location information 490 and the second location information 492 provided by the RCU 450 to wireless mesh beacon 421, wireless mesh beacon 431, and wireless mesh beacon 422 are provided to controller device 410, which uses the first location information 490 and the second location information 492 to determine the location and orientation of the RCU 450 within the network map 418 with respect to the controller device 410.

The first signal and the second signal is processed by the controller device to determine a location in the predetermined area for each of the plurality of wireless mesh beacons in the first subset and in the second subset (S738). Referring to FIG. 3, a first subset of wireless mesh beacons 320 includes wireless mesh beacons 321, 322, 323, 324, 325, 326, 327 that communicate directly with the controller device 310 via signals 340, 342, and a second subset of wireless mesh beacons 330 that includes wireless mesh beacons 331, 332, 333, 334, 335 that communicate with the first subset of wireless mesh beacons 320 via signals 346, 348. Controller device 310 may include a wireless receiver 312 for receiving, for example, signals 340, 342 from the first subset of wireless mesh beacons 320.

The method then ends (S750).

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
a controller device (CD) coupled to a display device;
a remote control unit (RCU) having a top wireless orientation beacon at a first end and a bottom wireless orientation beacon at a second end, wherein the top wireless orientation beacon and the bottom wireless orientation beacon provide location information to the controller device, and wherein the controller device processes the location information to determine a position and orientation of the RCU relative to the controller device; and
wherein the location information is provided in a first signal from the top wireless orientation beacon that includes a first identifier of the top wireless orientation beacon and a first timestamp and in a second signal from the bottom wireless orientation beacon that includes a second identifier of the bottom wireless orientation beacon and a second timestamp.

2. The system of claim 1, wherein at least one of:
the top wireless orientation beacon and the bottom wireless orientation beacon comprise Bluetooth Low Energy (BLE) beacons; and
the controller device generates an out-of-range indication when the controller device determines one of the RCU is not located within a predetermined area and the orientation of the RCU prevents the controller device from receiving a command signal from the RCU, wherein the out-of-range indication includes at least one of a vibration of the RCU, a sound played by the RCU or the display device, a warning displayed on the display device, and a voice notification played by the RCU or the display device.

3. The system of claim 1 further comprises a plurality of wireless mesh beacons disposed in a predetermined area to form a mesh network, the controller device using the plurality of mesh beacons to generate a map of the predetermined area.

4. The system of claim 3, wherein the plurality of wireless mesh beacons comprise a first subset of the plurality of wireless mesh beacons that communicate directly with the controller device and a second subset of the plurality of wireless mesh beacons that communicate with the first subset of the plurality of wireless mesh beacons, wherein the first subset of the plurality of wireless mesh beacons provides a first signal including a first identifier and timestamp of each wireless mesh beacon in the first subset of the plurality of wireless mesh beacons to the controller device and relays a second signal including a second identifier and timestamp of each wireless mesh beacon in the second subset of the plurality of wireless mesh beacons to the controller device, wherein the controller device processes the first signal and the second signal to determine a location in the predetermined area for each of the plurality of wireless mesh beacons in the first subset of the plurality of wireless mesh beacons and in the second subset of the plurality of wireless mesh beacons.

5. The system of claim 1, wherein the first signal and the second signal are received by a plurality of wireless mesh beacons, the plurality of wireless mesh beacons determining a power measurement associated with the first signal and with the second signal, the plurality of wireless mesh beacons forwarding, to the controller device, the first identifier of the top wireless orientation beacon, the first timestamp from the first signal, and the power measurement associated with the first signal, and the second identifier of the bottom wireless orientation beacon, the second timestamp from the second signal, and the power measurement associated with the second signal.

6. The system of claim 5, wherein the controller device determines a first position of the top wireless orientation beacon at the first end of the RCU using the first identifier of the top wireless orientation beacon, the first timestamp from the first signal, and the power measurement associated with the first signal, and determines a second position of the bottom wireless orientation beacon at the second end of the RCU using the second identifier of the bottom wireless orientation beacon, the second timestamp from the second signal, and the power measurement associated with the second signal.

7. The system of claim 6, wherein the controller device determines an orientation of the RCU based on the first position and the second position.

8. A method for determining a position of a remote control unit (RCU), comprising:
provproviding a controller device at a display device;
determining when a first signal is received at the controller device from a top wireless orientation beacon at a first end of a remote control unit in a predetermined area, and when a second signal is received at the controller device from a bottom wireless orientation beacon at a second end of the remote control unit in the predetermined area;
determining, when the first signal is received at the controller device, first location information associated with the top wireless orientation beacon from the first signal and, when the second signal is received at the controller device, second location information associated with the bottom wireless orientation beacon from the second signal; and
processing, by the controller device, the first location information to determine a position and orientation of the top wireless orientation beacon relative to the controller device, and the second location information to determine a position and orientation of the bottom wireless orientation beacon relative to the controller device.

9. The method of claim 8 further comprising:
forming a mesh network using a plurality of wireless mesh beacons disposed in the predetermined area; and
generating a map of the predetermined area based on signals from the plurality of wireless mesh beacons in the mesh network.

10. The method of claim 9, wherein the generating the map of the predetermined area based on the signals from the plurality of wireless mesh beacons further comprises transmitting a first signal from a first subset of the plurality of wireless mesh beacons directly to the controller device and transmitting the second signal from a second subset of the plurality of wireless mesh beacons to the plurality of wireless mesh beacons for forwarding to the controller device.

11. The method of claim 10, wherein the transmitting the first signal from the first subset of the plurality of wireless mesh beacons comprises transmitting a first identifier and timestamp of each wireless mesh beacon in the first subset of the plurality of wireless mesh beacons to the controller device and the transmitting the second signal from the second subset of the plurality of wireless mesh beacons to the first subset of the plurality of wireless mesh beacons further comprises transmitting a second identifier and timestamp of each wireless mesh beacon in the second subset of the plurality of wireless mesh beacons that is forwarded by the first subset of the plurality of wireless mesh beacons to the controller device.

12. The method of claim 10 further comprising processing the first signal and the second signal by the controller device to determine a location in the predetermined area for each of the plurality of wireless mesh beacons in the first subset of the plurality of wireless mesh beacons and in the second subset of the plurality of wireless mesh beacons.

13. The method of claim 8, wherein at least one of:
the determining, when the first signal is received at the controller device, first location information associated with the top wireless orientation beacon from the first signal further comprises determining a first identifier and a first timestamp associated with the top wireless orientation beacon in the first end of the RCU, and wherein the determining when the second signal is received at the controller device, second location information associated with the bottom wireless orientation beacon from the second signal further comprises determining a second identifier and a second timestamp associated with the bottom wireless orientation beacon in the first end of the RCU; and
the processing, by the controller device, the first location information to determine the position and orientation of the top wireless orientation beacon relative to the controller device and the second location information to determine the position and orientation of the bottom wireless orientation beacon relative to the controller device further comprises determining one of the RCU is not located within the predetermined area and the orientation of the RCU prevents the controller device from receiving a command signal from the RCU, and generating an out-of-range indication when one of the RCU is determined to not be located within the predetermined area and the orientation of the RCU prevents the controller device from receiving the command signal from the RCU.

14. The method of claim 13, wherein the processing, by the controller device, of the location information to determine a position and orientation of the RCU in the predetermined area relative to the controller device further comprises processing the first location information and the second location information to determine a first position of the top wireless orientation beacon at the first end of the RCU, to determine a second position of the bottom wireless orientation beacon at the second end of the RCU, and to determine the orientation of the RCU based on the first position and the second position.

15. A non-transitory computer-readable media having computer-readable instructions stored thereon, which when executed by a processor causes the processor to perform operations comprising:
providing a controller device at a display device;
determining when a first signal is received at the controller device from a top wireless orientation beacon at a first end of a remote control unit (RCU) in a predetermined area, and when a second signal is received at the controller device from a bottom wireless orientation beacon at a second end of the remote control unit in the predetermined area;
determining, when the first signal is received at the controller device, first location information associated with the top wireless orientation beacon from the first signal and, when the second signal is received at the controller device, second location information associated with the bottom wireless orientation beacon from the second signal; and
processing, by the controller device, the first location information to determine a position and orientation of the top wireless orientation beacon relative to the controller device, and the second location information to determine a position and orientation of the bottom wireless orientation beacon relative to the controller device.

16. The non-transitory computer-readable media of claim 15 further comprising:
forming a mesh network using a plurality of wireless mesh beacons disposed in the predetermined area; and
generating a map of the predetermined area based on signals from the plurality of wireless mesh beacons in the mesh network.

17. The non-transitory computer-readable media of claim 16, wherein the generating the map of the predetermined area based on the signals from the plurality of wireless mesh beacons further comprises transmitting a first signal from a first subset of the plurality of wireless mesh beacons directly to the controller device and transmitting the second signal from a second subset of the plurality of wireless mesh beacons to the plurality of wireless mesh beacons for forwarding to the controller device.

18. The non-transitory computer-readable media of claim 17, wherein at least one of:
- the transmitting the first signal from the first subset of the plurality of wireless mesh beacons comprises transmitting a first identifier and timestamp of each wireless mesh beacon in the first subset of the plurality of wireless mesh beacons to the controller device and the transmitting the second signal from the second subset of the plurality of wireless mesh beacons to the first subset of the plurality of wireless mesh beacons further comprises transmitting a second identifier and timestamp of each wireless mesh beacon in the second subset of the plurality of wireless mesh beacons that is forwarded by the first subset of the plurality of wireless mesh beacons to the controller device; and
- the computer-readable instructions when executed by the processor further cause the processor to perform operations comprising processing the first signal and the second signal by the controller device to determine a location in the predetermined area for each of the plurality of wireless mesh beacons in the first subset of the plurality of wireless mesh beacons and in the second subset of the plurality of wireless mesh beacons.

19. The non-transitory computer-readable media of claim 15, wherein at least one of:
- the determining, when the first signal is received at the controller device, first location information associated with the top wireless orientation beacon from the first signal further comprises determining a first identifier and a first timestamp associated with the top wireless orientation beacon in the first end of the RCU, and wherein the determining when the second signal is received at the controller device, second location information associated with the bottom wireless orientation beacon from the second signal further comprises determining a second identifier and a second timestamp associated with the bottom wireless orientation beacon in the first end of the RCU; and
- the processing, by the controller device, the first location information to determine the position and orientation of the top wireless orientation beacon relative to the controller device and the second location information to determine the position and orientation of the bottom wireless orientation beacon relative to the controller device further comprises determining one of the RCU is not located within the predetermined area and the orientation of the RCU prevents the controller device from receiving a command signal from the RCU, and generating an out-of-range indication when one of the RCU is determined to not be located within the predetermined area and the orientation of the RCU prevents the controller device from receiving the command signal from the RCU; and
- the processing, by the controller device, of the first location information and the second location information to determine a position and orientation of the RCU in the predetermined area relative to the controller device further comprises processing the first location information and the second location information to determine a first position of the top wireless orientation beacon at the first end of the RCU, to determine a second position of the bottom wireless orientation beacon at the second end of the RCU, and to determine the orientation of the RCU based on the first position and the second position.

* * * * *